March 15, 1927. 1,621,441
H. SUIDA
PRODUCTION OF CONCENTRATED ACETIC ACID FROM DILUTE
AQUEOUS SOLUTIONS OF THE SAME
Filed Feb. 27, 1925 2 Sheets-Sheet 1
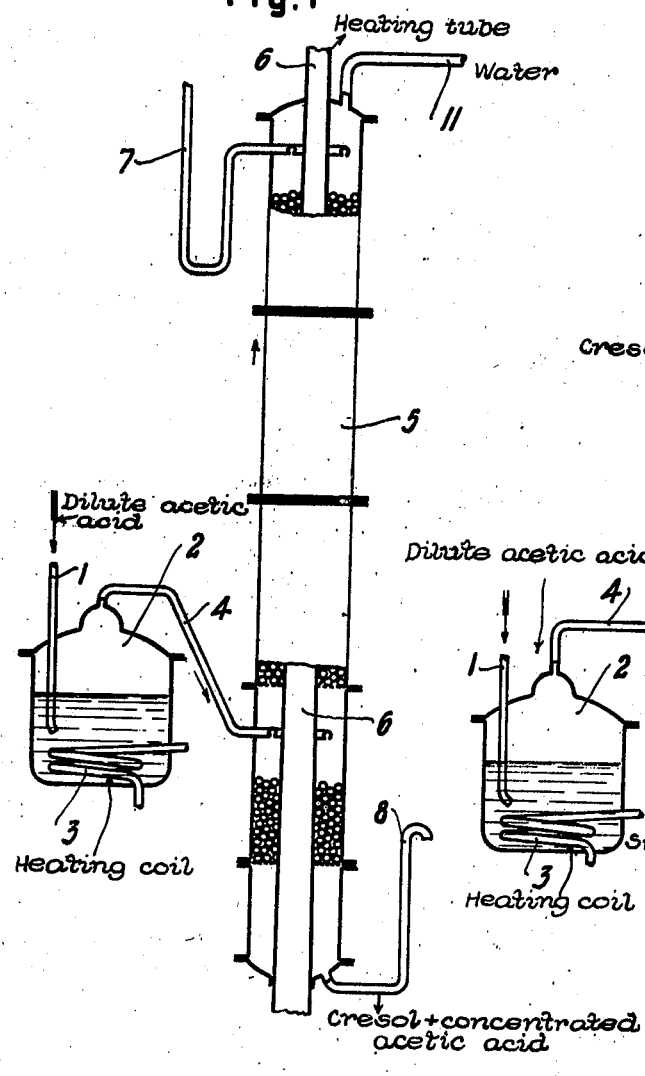
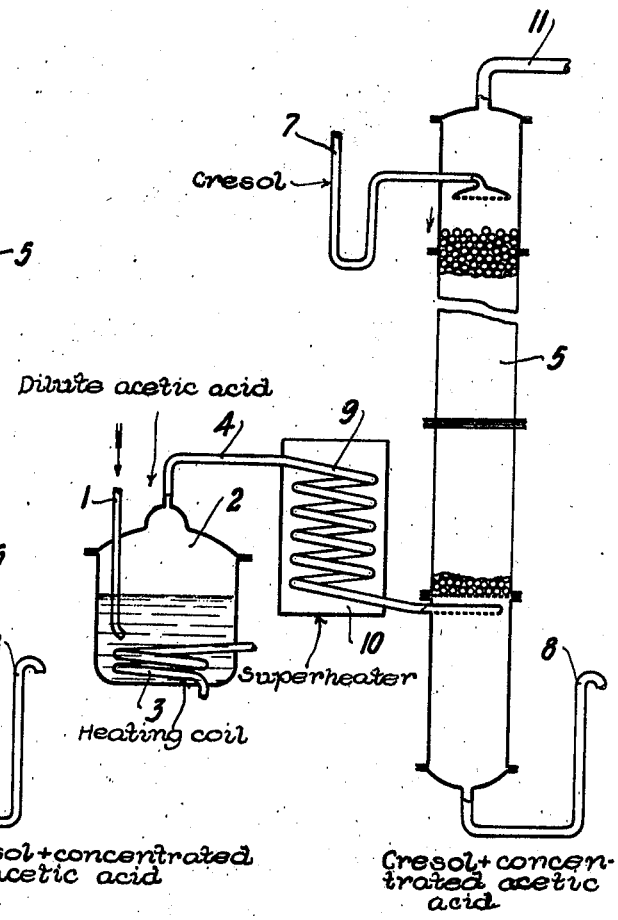
Inventor
Hermann Suida,
by *[signature]*
Attorney.

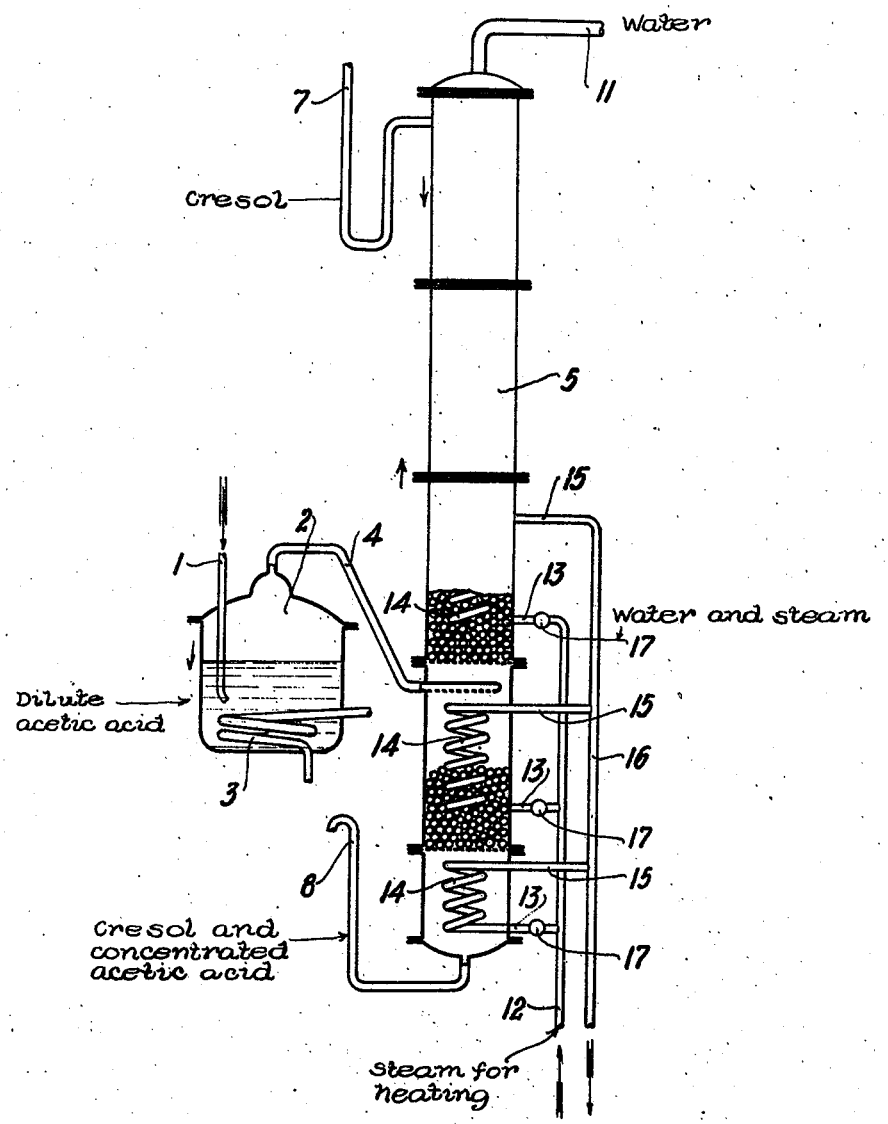

Patented Mar. 15, 1927.

1,621,441

UNITED STATES PATENT OFFICE.

HERMANN SUIDA, OF MÖDLING, LOWER AUSTRIA, AUSTRIA.

PRODUCTION OF CONCENTRATED ACETIC ACID FROM DILUTE AQUEOUS SOLUTIONS OF THE SAME.

Application filed February 27, 1925, Serial No. 12,180, and in Austria March 8, 1924.

This invention relates to the production of concentrated acetic acid from dilute aqueous solutions of the same.

It is known that acetic acid can be extracted, fairly satisfactorily, by treating dilute aqueous solutions of acetic acid with liquid solvents which, while insoluble or only sparingly soluble in water, have a high solvent power for acetic acid, and that, after the solvent has been suitably separated, the acetic acid is more concentrated, in respect of water, than it was originally.

According to this invention the extraction of acetic acid from dilute aqueous solutions of the same can be effected very much more favorably and with incomparably greater success if the mixture of acetic acid and water vapor, from which the acetic acid is to be extracted, is superheated to 150° C., for example, prior to treatment with solvents which have already been proposed by me for the same purpose. The solvents are those which, while being only slightly soluble or soluble to an insignificant extent in water and having a high solvent power for acetic acid, have a boiling point of over 150° C., that is to say, a boiling point considerably higher than that of pure acetic acid. Chief among these solvents may be mentioned aromatic compounds containing hydroxyl groups and therefore mainly bodies belonging to the phenol group, or mixtures of the same, such as monovalent phenols (with the exception of carbolic acid), for example cresols, polyvalent phenols, especially in the form of their ethers (guaiacol and its homologues), hydrogenized phenols, such as hexahydrocresols and derivatives of the above mentioned compounds; and finally all natural or artificial mixtures containing the aforesaid compounds, especially heavy phenolic wood-tar oils (creosotes), brown-coal-tar creosotes and coal tar creosotes, also liquid fatty acids having boiling points above 150° C., such as the higher homologues of acetic acid, or also oleic acid.

The process may be carried into effect as follows:

Either a previously superheated mixture of acetic acid and water vapor is introduced from below into the extraction apparatus (which may suitably take the form of a column still) while the extraction agent is introduced from the opposite direction, in counter-current, in which case the water vapor freed from acetic acid, is discharged from the upper end of the column, while the extraction agent, saturated with concentrated acetic acid, issues from the lower end of the column. Or the process may be carried out by heating the column to temperatures sufficient to superheat the acetic acid with water vapor therein, without the latter being introduced in a superheated condition into the lower end of the column.

It is well known that "saturated" vapors behave differently from "superheated" vapors. In the present instance the solvent takes up far larger quantities of concentrated acetic acid in proportion to its own weight than it would if the extraction were effected by vapors that had not been superheated. At the same time, the acetic acid contained in the extraction agent is in a far more highly concentrated state than if the extraction were effected, with the same extraction agents, from a cold or warm liquid mixture of acetic acid and water, or from the mixture of the saturated acetic acid and water vapors. This needs no explanation, since the solubility of the superheated water vapor in the extraction agent is insignificant, whereas the solubility of the superheated acetic acid vapors is very considerable. Owing to the diminution in vapor pressure, which is caused in the acetic acid in the presence of the extraction agent, its boiling point is considerably increased, and therefore raised above 119° C, whereas, at this temperature, the water vapor, superheated to least 119° C. or more is able to escape in the absence of any diminution in vapor pressure due to the presence of the extraction agent. The extraction and enrichment process therefore takes place at temperatures from 101° C. upward, that is to say, above the temperature of the saturated mixture of acetic acid and water vapor (assuming this to be dilute acetic acid of about 10% strength) subjected to the process.

In the accompanying drawing Figs. 1 and 2 illustrate, by way of example, diagrammatically and in partial longitudinal section, embodiments of devices which will serve for carrying the process into effect.

Referring to Fig. 1, acetic acid, for example, of 10% strength, is passed through a pipe 1 into a still 2, and is vaporized by means of a coil 3. The vapors pass through the pipe 4 into a column 5, charged with filling material such as rings or the like, said column being traversed by an axial heating tube 6. Crude cresol, approximately equal in quantity to the introduced mixture of acetic acid and water vapor, is admitted in a continuous flow through the pipe 7. Heated air is led through the heating tube 6 from below, so that the temperature of the column, at the upper end, is not much higher than 100° C., whereas, lower down, the temperature is appropriately higher, so that the vapors entering through the end of the pipe 4 which admits the mixture of acetic acid and water vapor, are superheated at that point. At the lower end of the columns, hot cresol charged with acetic acid of 80 to 90% strength, is discharged continuously through the siphon 8, and can be separated, also in a continuous manner, into its two components, crude cresol and highly concentrated acetic acid (from 80 to 90% strength) in an attached still, preferably in vacuo. The water vapor escapes through the pipe 11 at the upper end of the column.

In another embodiment of the column apparatus, shown in Fig. 3, the column, instead of being heated by air flowing through a heating tube, may be provided with several (for instance 3) heating coils 14, into which the heating fluid, which may be hot water or steam, is introduced by means of pipes 13 branching off from a main pipe 12. Each pipe 13 is provided with a regulating valve 17 which makes it possible to maintain the desired temperature in the coils. At the upper end of the coils the steam escapes through tubes 15 and is carried off through the common pipe 16. This arrangement allows a very accurate control of the superheating temperature.

The heating of the column can also be effected by a heating jacket.

If the operation be carried on in the same manner, but without superheating the vapors, the cresol discharged from the column will be charged with acetic acid of only 30% strength.

Fig. 2 shows an embodiment of the column apparatus in which the mixture of acetic acid and water vapor, of about 10% strength, is superheated prior to its admission into the column. In this case, the vapor mixture from the still 2 is first passed through a coil 9 arranged in a vessel 10 filled with a suitable heating liquid, and passes thence, in a superheated condition, into the column 5, through the filling material upon which crude cresol or the like is allowed to trickle down from a pipe 7, terminating in a sprinkler 12. In this case also, the water vapor escapes through the pipe 11, while a solution of 80-90% acetic acid in cresol is discharged continuously through the siphon 8. The heating of the column in this case is effected by the superheated mixture of acetic acid and water vapor.

In the above examples, only crude cresol is mentioned as solvent for the acetic acid. It is, however, self-evident that the other previously mentioned liquids could equally well be used, without any alteration in the working method or in the apparatus.

What I claim is:

1. A process for producing concentrated acetic acid from dilute aqueous solutions which consists in evaporating the aqueous solution, in superheating the mixture of vapours of acetic acid and water and in extracting the acetic acid from the superheated mixture.

2. A process for producing concentrated acetic acid from dilute aqueous solutions thereof which consists in evaporating said solutions, in superheating the mixture of vapours of acetic acid and water and in extracting the acetic acid vapors from the mixture by a solvent having a higher boiling point than acetic acid.

3. A process for producing concentrated acetic acid from dilute aqueous solutions thereof which consists in evaporating said solutions, in superheating the mixture of vapours of acetic acid and water and in extracting the acetic acid vapors from the mixture by a solvent having a higher boiling point than acetic acid and being practically insoluble in water.

4. A process for producing concentrated acetic acid from dilute aqueous solutions thereof which consists in evaporating said solutions, in superheating the mixture of vapours of acetic acid and water, in extracting the acetic acid vapors from the mixture by a solvent having a higher boiling point than acetic acid, being practically insoluble in water, and in recovering the solvent containing acetic acid.

5. A process for producing concentrated acetic acid from dilute aqueous solutions thereof which consists in evaporating said solutions, in superheating the mixture of vapours of acetic acid and water, in extracting the acetic acid vapors from the mixture by a solvent having a higher boiling point than acetic acid, being practically insoluble in water, in recovering the solvent containing acetic acid and in separating acetic acid therefrom by distillation.

6. A process for producing concentrated acetic acid from dilute aqueous solutions thereof which consists in evaporating said solutions, in superheating the mixture of vapours of acetic acid and water, in extracting the acetic acid vapors from the mixture by a solvent belonging to the phenol group and having a higher boiling point than acetic acid, being practically insoluble in water, in recovering the solvents containing acetic acid and in separating acetic acid therefrom by distillation.

7. A process for producing concentrated acetic acid from dilute aqueous solutions thereof which consists in evaporating said solutions, in superheating the mixture of vapours of acetic acid and water, in extracting the acetic acid vapors from the mixture by cresol, in recovering the cresol and in separating acetic acid therefrom by distillation.

8. A process for producing concentrated acetic acid from dilute aqueous solutions thereof which consists in evaporating said solutions, in superheating the mixture of vapours of acetic acid and water during extraction and within the extraction apparatus, in extracting the acetic acid vapors from the mixture by a solvent having a higher boiling point than acetic acid, being practically insoluble in water, and in recovering the solvent containing acetic acid.

In testimony whereof I affix my signature.

HERMANN SUIDA.